United States Patent
Ito

[11] Patent Number: 6,005,868
[45] Date of Patent: Dec. 21, 1999

[54] TRAFFIC SHAPING DEVICE

[75] Inventor: Atsuo Ito, Tokyo, Japan

[73] Assignee: NEC Corporation, Japan

[21] Appl. No.: 08/937,707

[22] Filed: Sep. 25, 1997

[30] Foreign Application Priority Data

Sep. 27, 1996 [JP] Japan .................................. 8-255628

[51] Int. Cl.$^6$ ............................. H04L 12/28; H04L 12/56
[52] U.S. Cl. ................................... 370/413; 370/232
[58] Field of Search .................................. 370/413, 229, 370/230, 232, 233, 234, 235, 252, 253, 395, 397, 412, 415, 417, 444, 389, 391, 392, 394, 396, 399, 400, 409, 411, 423

[56] References Cited

U.S. PATENT DOCUMENTS

| | | | |
|---|---|---|---|
| 5,519,689 | 5/1996 | Kim | 370/232 |
| 5,530,698 | 6/1996 | Kozaki et al. | 370/412 |
| 5,533,009 | 7/1996 | Chen | 370/232 |
| 5,541,926 | 7/1996 | Saito et al. | 370/474 |
| 5,640,389 | 6/1997 | Masaki et al. | 370/418 |
| 5,694,554 | 12/1997 | Kawabata et al. | 370/412 |
| 5,696,764 | 12/1997 | Soumiya et al. | 370/395 |

FOREIGN PATENT DOCUMENTS

| | | |
|---|---|---|
| 8-125668 | 5/1996 | Japan . |
| 8-163145 | 6/1996 | Japan . |
| 8-242238 | 9/1996 | Japan . |
| 10-23037 | 1/1998 | Japan . |
| 10-56492 | 1/1998 | Japan . |

*Primary Examiner*—Dang Ton
*Assistant Examiner*—Phirin Sam
*Attorney, Agent, or Firm*—Ostrolenk, Faber, Gerb & Soffen, LLP

[57] ABSTRACT

In a traffic shaping device which can control a cell sending rate with using a common circuit portion regardless of the number of cell buffers, cells 31 input to a cell input portion 32 are stored in corresponding ones of cell buffers $35_1$~$35_N$ prepared for every one of traffics having different shaping rates. Cell buffer registers $41_1$~$41_N$ are provided correspondingly to the cell buffers $35_1$~$35_N$ and an output time from an output time notice counter 43 which is incremented every cell period is compared with values of cell output enabling time registers 48. One of the cell buffers which is enabled to output are permitted to output the cell stored therein if any through a cell output portion 37. Thereafter, the values of the cell output enabling time registers 48 are rewritten on the basis of contents of cell output interval registers 52. Regulation of priorities of the cell buffers is also performed by a priority registers 51.

5 Claims, 2 Drawing Sheets

TRAFFIC SHAPING DEVICE

BACKGROUND OF THE INVENTION

1. Field of the Invention

The present invention relates to a traffic shaping device for absorbing fluctuation of delay of cells in an ATM (Asynchronous Transfer Mode) network.

2. Description of the Related Art

In the ATM network for transmitting packets each having a fixed length and called a cell, cells on virtual channels (VC) are multiplexed and then transferred through a virtual path (VP). Since the multiplexing is performed asynchronously in the ATM transfer system, the so-called cell delay fluctuation occurs. If a cell having an interval which is reduced due to the cell delay fluctuation is generated, a burst traffic occurs on the virtual path and so the utilization efficiency of the network resources is lowered. In order to solve such problem, a traffic shaping device has been proposed.

FIG. 1 is a schematic circuit diagram showing an example of a conventional traffic shaping device. In FIG. 1, the conventional traffic shaping device includes an ATM cell input portion 12 for receiving at least one ATM cell 11. The ATM cell input portion 12 sends the ATM cell input thereto to a cell buffer selector portion 13. The cell buffer selector portion 13 selects one or more of first to N-th cell buffers $14_1$ to $14_N$ on the basis of an identifier attached to the ATM cell 11 input to the ATM cell buffer selector portion 13, where N is an integer larger than 1. A cell buffer is provided for every virtual channel and a cell 15 is stored in the cell buffer selected by the cell buffer selector portion 13. Those of the first to N-th cell buffers $14_1 \sim 14_N$ in which cells 15 are already stored output not-empty signals 16 indicative of filled cell buffers. The not-empty signal 16 is sent to an output cell buffer selector portion 17.

The first to N-th cell buffers $14_1 \sim 14_N$ are provided with a first to N-th shaping counters $18_1 \sim 18_N$, respectively. The first to N-th shaping counters 18~18 function to perform a rate control between the cell buffers $14_1 \sim 14_N$ having different shaping rates and to send output request signals 19 to the output cell buffer selector portion 17, independently, with intervals assigned to the respective shaping counters $18_1 \sim 18_N$. The output cell buffer selector portion 17 selects at least one of the cell buffers 14 which is to be permitted to send a cell stored therein in a cell period corresponding to the maximum rate of a cell output portion 21 provided on the output side of the respective cell buffers $14_1 \sim 14_N$. In a case where, in a certain cell period, there is an output request from any shaping counter 18 and there is a cell stored in a cell buffer 14 corresponding to this shaping counter 18, a cell output permit signal 22 is output to the cell buffer 14 corresponding to the cell buffer 14. Further, in a case where, in a certain cell period, there are output requests from a plurality of the shaping counters 18 and there are cells stored in a plurality of cell buffers among the cell buffers 14 corresponding to the respective shaping counters 18, a cell output permit signal 22 is sent to one of the cell buffers 14 having the cells stored therein, which stores a cell of a class having the highest priority, according to a predetermined fixed priority. There may be a case where a cell output permit signal 22 is sent to one of cell buffers according to a simple rotation without using a special priority.

In response to the cell output permit signal 22, the selected one of the first to N-th cell buffers $14_1 \sim 14_N$ sends a cell 23 stored therein to the cell output portion 21. The cell output portion 21 sends the cell 23 to a switch portion or a channel adapter portion which is provided in a subsequent stage although not shown. The number of the first to N-th shaping counters $18_1 \sim 18_N$ is the same as the number of the cell buffers $14_1 \sim 14_N$.

In the conventional traffic shaping device constructed as mentioned above, the shaping counters $18_1 \sim 18_N$ are provided for the respective cell buffers $14_1 \sim 14_N$ for every traffic class or every output port in an ATM switch. The output request signal 19 is sent by one of these shaping counters $18_1 \sim 18_N$ at a rate assigned to the corresponding one of the cell buffers $14_1 \sim 14_N$.

In a recent ATM switch, in order to guarantee the quality of various traffics, cell buffers arranged correspondingly to the classes of traffics are arranged to make a traffic control possible for every class. Further, in order to offer services of higher quality, a traffic control for every virtual channel has been studied. In order to control the cell sending rate in such case, the shaping counters $18_1 \sim 18_N$ are prepared correspondingly to the respective virtual channels and, therefore, there is a problem that the number of the shaping counters $18_1 \sim 18_N$ is increased with increase of the number of the cell buffers $14_1 \sim 14_N$ and the amount of hardware in a traffic shaping device becomes very large.

Therefore, an object of the present invention is to provide a traffic shaping device capable of controlling a cell sending rate by means of a common circuit portion thereof even when a plurality of cell buffers exist.

SUMMARY OF THE INVENTION

In order to achieve the above object, according to an aspect of the present invention, a traffic shaping device is provided, which comprises (a) a plurality of cell buffers provided for respective traffic signals having different shaping grades of cells arriving at the traffic shaping device according to an ATM transfer system, (b) a cell buffer selector for identifying each cell when the cell arrives and storing the cell in a corresponding one of the plurality of cell buffers, (c) a cell output portion for outputting cells stored in a plurality of the cell buffers, (d) an output time notice counter having a count value incremented every cell period as a minimum period required to send out a cell from the cell output portion, (e) cell output enabling time registers provided for the respective traffic signals having different shaping grades for sequentially registering output enabling times of the cell buffers corresponding to the respective traffic signals and (f) a cell sending permit circuit for comparing an output time noticed by the output time notice counter with the output enabling times registered in the cell output enabling time registers provided for every virtual channel to enable one of the cell buffers and permitting the enabled cell buffer to output a cell stored therein to the cell output portion.

That is, in the first aspect of the present invention, a cell buffer which becomes enabled at an output enabling time at which it is enabled to output a cell stored therein is permitted to send the cell to the cell output portion by incrementing the count value of the output time notice counter every cell period while registering the output enabling times of the respective cell buffers and by comparing the output of the output time notice counter with the output enabling times. Therefore, it is possible to permit or inhibit the output of cells stored in the respective cell buffers to the cell output portion, by using a common measure and it becomes possible to control the sending rates of the respective cells by using a common circuit portion regardless of the number of the cell buffers.

Each of the cell output enabling time registers of the traffic shaping device mentioned above comprises a cell output interval register for registering a cell output interval for every one of traffic signals having different shaping grades and a cell output enabling time register for adding cell output intervals to a time at which a cell buffer permitted to output a cell stored therein outputs the cell and by registering the sum as a next output enabling time. That is, the next cell output enabling time is registered such that the cell output interval of the cell corresponding to the cell buffer is maintained.

According to another aspect of the present invention, a traffic shaping device is provided, which comprises (a) a plurality of cell buffers for respective traffic signals having different shaping grades of cells arriving at the traffic shaping device according to an ATM transfer system, (b) a cell buffer selector for identifying each cell when the cell arrives and storing the cell in a corresponding one of the plurality of cell buffers, (c) a cell output portion for outputting cells stored in a plurality of the cell buffers, (d) an output time notice counter having a count value incremented every cell period as a minimum period for sending a cell from the cell output portion, (e) cell output enabling time registers provided for the respective traffic signals having different shaping grades for sequentially registering output enabling times of the cell buffers corresponding to the respective traffic signals, (f) priority registers prepared for every one of the traffic signals having different shaping grades for registering priorities of outputs of the cells stored in corresponding cell buffers and (g) cell sending permit circuits for comparing an output time noticed by the output time notice counter with the output enabling times registered in the cell output enabling time registers provided for respective virtual channels to enable the cell buffers and permitting one of the enabled cell buffers, which has a highest priority, to output the cell stored therein to the cell output portion when a plurality of cell buffers enabled to output their cells exist.

That is, in the above mentioned traffic shaping device, a cell buffer which is enabled to output its cell is permitted to send its cell to the cell output portion by incrementing the count value of the output time notice counter every cell period while registering the output enabling times of the cell buffers and by comparing the output enabling times with the output of the output time notice counter. Therefore, there may be a case where a plurality of cell buffers are enabled to send cells store therein. In order to accommodate the traffic shaping device to such situation, the priority is registered for every cell buffer. When a conflict occurs between these cell buffers, only a cell buffer among them, which has the highest priority, is permitted to send a cell stored therein to the cell output portion.

That is, the cell output permit circuit of the traffic shaping device includes priority regulators provided for the respective cell buffers. When there are a plurality of cell buffers which are enabled to output the cells stored therein, one of the priority regulators corresponding to the enabled cell buffers, which corresponds to one of the cell buffers which is permitted to send its cell, lowers the priority level of the permitted cell buffer which is registered in one of the priority registers which corresponds to the permitted cell buffer and the priority regulators corresponding to other enabled cell buffers which are not permitted to output their cells increases the priority levels of the enabled but not permitted cell buffers which are registered in the priority registers corresponding thereto.

Further, although, when a conflict between the cell buffers occurs, the cell stored in buffer having the highest priority is sent out the cell, there may be considerable delay in sending out cells of the other cell buffers if the cells are sent out with the same priority levels in a next period. In the present invention, in order to make the cell sending conditions fair in such case, the priority levels of the cell buffers which successfully sent their cells in a preceding period are lowered and the priority levels of the other cell buffers which conflict therewith are increased.

The priority regulators of the traffic shaping device reset the content of the priority registers when the priority levels thereof are to be lowered and count up the content of the priority registers one by one when the priority levels thereof are to be increased. The above mentioned scheme for regulating the priority is a mere example and the present invention is not limited thereto.

DETAILED DESCRIPTION OF THE PREFERRED EMBODIMENT

An embodiment of the present invention will be described in detail with reference to FIGS. 2 and 3.

Figure 1:
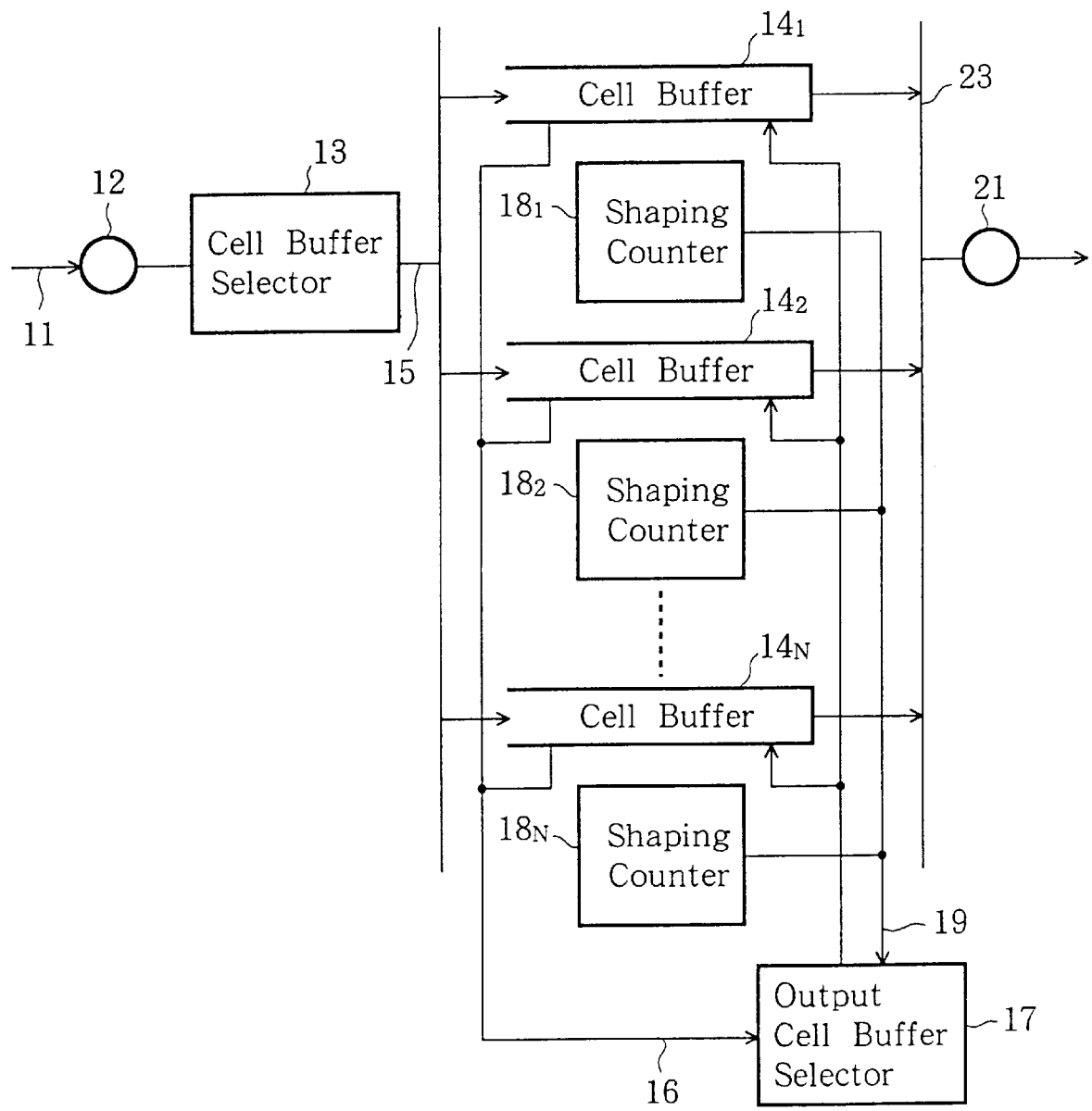
FIG. 1 shows an example of a conventional traffic shaping device.
Figure 2:
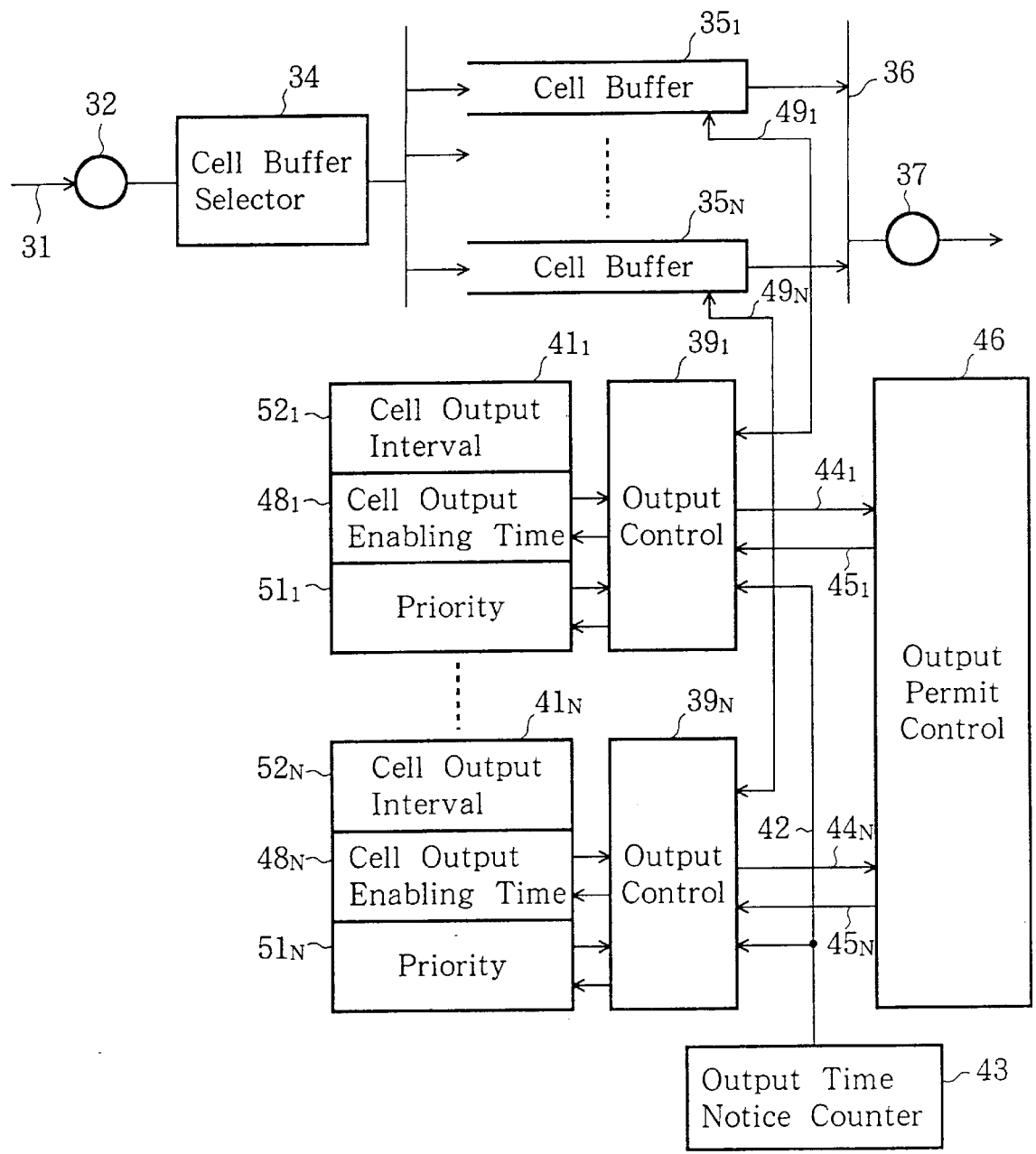
FIG. 2 is a block circuit diagram showing a traffic shaping device according to an embodiment of the present invention.

FIG. 2 is a block circuit diagram schematically showing a construction of a traffic shaping device according to the embodiment of the present invention. The traffic shaping device includes a cell input portion 32 to which an ATM cell 31 is input.

Figure 3:
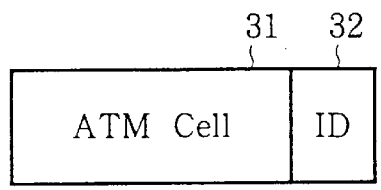
FIG. 3 shows a structure of a cell input to a cell buffer selector portion shown in FIG. 2.

FIG. 3 shows a structure of the ATM cell 31 input to the cell input portion 32. An identifier 33 indicative of a traffic class or an output path is attached to a head of the ATM cell 31.

A cell buffer selector portion 34 receives the ATM cell 31 from the cell input portion 32 and selects one of a first to N-th cell buffers $35_1 \sim 35_N$ in which the cell is to be stored, on the basis of the identifier 33 attached to the ATM cell 31. This is repeated for every ATM cell 31 so that the ATM cells 31 are stored in the selected cell buffers one by one. A cell output portion 37 is provided on the output side of the cell buffers $35_1 \sim 35_N$, to send cells 36 output from the cell buffers $35_1 \sim 35_N$ to a switch portion or a channel adapter portion which is provided in a succeeding stage although not shown.

The traffic shaping device further includes first to N-th output control portions $39_1 \sim 39_N$ and first to N-th cell buffer registers $41_1 \sim 41_N$, corresponding to the first to N-th cell buffers $35_1 \sim 35_N$, respectively. Further, an output time notice counter 43 for noticing the first to N-th output control portions $39_1 \sim 39_N$ a count value corresponding to a current time and an output permit control portion 46 which, in response to output permit request signals $44_1 \sim 44_N$ from the respective output control portions $39_1 \sim 39_N$, outputs output instruction signals $45_1 \sim 45_N$ indicative of a permission of cell output or an inhibition of cell output.

The output control portions $39_1 \sim 39_N$ receive the output instruction signals $45_1 \sim 45_N$ indicative of cell output permission from the output permit control portion 46 and cause one of the cell buffers $35_1 \sim 35_N$ to read out one of the cells stored therein, which was written therein at the earliest time. The cells 36 thus read out sequentially from the first to N-th cell buffers $35_1 \sim 35_N$ are input to the cell output portion 37 from which they are sent to the switch portion or the channel adapter.

Incidentally, the output time notice counter 43 is incremented for every cell using the cell period of the maximum throughput of the cell output portion 37 as unit. The count value of the output time notice counter 43 is delivered commonly to the output control portions $39_1 \sim 39_N$ as the current time 42. The output control portion or portions $39_1 \sim 39_N$ compare the cell output enabling time or times written in a cell output enabling time register or registers 48 of the corresponding ones of the cell buffer registers $41_1 \sim 41_N$ with the current time 42 and, when the current time 42 is the same as or later than the cell output enabling time or times of the cell output enabling time register or registers 48, checks the state of the cell buffers 35, busy or idling, which are noticed from corresponding ones of control lines $49 \sim 49_N$. The output permit request signals $44_1 \sim 44_N$ are sent from the output control portions 39 to the output permit control portion 46 together with corresponding ones of values stored in priority registers $51_1 \sim 51_N$ of the cell buffer registers $41_1 \sim 41_N$ when there are cells stored in the cell buffers and to be output therefrom.

The output permit control portion 46 selects one of the output permit request signals 44 from the output control portions 39, which is related to one of the priority registers 51 having the maximum value among others, that is, the highest priority, and outputs to the output control portion 39 an output instruction signal 45 indicative of permission of cell output. On the other hand, the output permit control portion 46 outputs output instruction signals 45 indicative of inhibition of cell output against other output permit request signals related to lower priority levels if there are such output permit request signals in the same cell period. In a case where there are a plurality of output permit request signals having same values in the priority registers 51, that is, there are a plurality of output permit request signals having the same priority level, the output instructing signal 45 for permitting cell output is output according to a rotation in which the priorities of the output permit request signals are determined in a predetermined sequence. The term "rotation" means in this description a priority control in which, in selecting one of a plurality of output permit request signals, initial values of the priority levels are preliminarily given sequentially to these output permit request signals and the priority levels thereof are controlled such that lowest priority level is given to an output permit request signal to which the highest priority is given in a preceding time and a cell related thereto was output, and so on. This priority control may also be referred to as "round robin".

It is assumed that the K-th output instructing signal $45_K$ of the output instructing signal $45_1 \sim 45_N$ is output. In this case, an instruction for reading out a cell stored in the K-th cell buffer $35_K$ at the earliest time is given through the K-th control line $49_K$ to the K-th cell buffer. In order to lower the priority of the K-th cell buffer in the next time, the value of the priority register $51_K$ of the K-th cell buffer register $41_K$ is cleared and a sum of the current time 42 supplied from the output time notice counter 43 and the cell output interval written in the cell output interval register $52_K$ of the K-th cell buffer register $41_K$ is written in the cell output enabling time register 48 of the K-th cell buffer register $41_K$ as the next cell output enabling time of the K-th cell buffer.

For the other cell buffers 35 the output from which are inhibited by the output instructing signal $45_K$, the values of the priority registers 51 thereof are counted up by one, respectively, in order to give higher priorities thereto in the next time. However, the contents of the cell output enabling time registers 48 of these are maintained as they are since these cell buffers 35 are inhibited to send their cells. That is, when the output permit control portion 46 sends the output instructing signal 45 in the next cell period, the priority levels of the cell buffers 35 which have lower priority levels are increased to determine whether or not the cell output is permitted.

As mentioned, the first to N-th cell buffers $35_1 \sim 35_N$ are allowed to output the cells therein according to the cell output intervals written in the cell output interval registers 52 of the first to N-th cell buffer registers $41_1 \sim 41_N$. That is, it is possible to limit the sending rates of the cells 36 to predetermined different rates or less, respectively. Further, when an output conflict occurs, deviation in the transmission interval between the cells becomes the same as the number of the conflicting cells, so that it is possible to make the throughput as large as possible. Further, since, due to the existence of the conflict, the priority is increased sequentially with increase of the idling time and the priority levels of the cells which were successfully sent are lowered, the cell reading is evenly performed between the respective cell buffers $35_1 \sim 35_N$.

Although in this embodiment, the priority of one of the conflicting cell buffers whose cell transmission was permitted is cleared to "0", its priority may be lowered by a predetermined amount of value which is not "0". Alternatively, the cell buffer may assign its cell sending right to another cell buffer only once, while keeping its priority. Further, although the circuit of this embodiment is constructed with random logic, registers and memories, it is possible to construct it with a CPU (Central Processing Unit) and a control program.

As described hereinbefore, according to the first aspect of the present invention in which the output time notice counter is provided commonly for the cell buffers and the cell buffers are provided for registering their output enabling times, it is possible to control the cell sending rates by using a common circuit portion (time measuring counter) by comparing these output enabling times with the time from the common output time notice counter regardless of the number of the cell buffers, to thereby prevent the circuit size from being substantially increased, reduce the cost of the traffic shaping device and maintain the reliability of the circuit.

Further, according to the second aspect of the present invention in which the concept of the priority is introduced into the first aspect, it is possible to permit the cell sending from the cell buffers in sequence of necessity even if there is a conflict in permission of cell sending.

Further, the priority of the cell buffer which is set to a high level can be regulated with respect to the priorities of other cell buffers, so that it is possible to make the cell sending permission fair between the cell buffers.

I claim:

1. A communication traffic shaping device comprising:
    a plurality of cell buffers each provided for respective communication traffic signals having different shaping grades of cells arriving at said traffic shaping device according to an ATM transfer system;
    a cell buffer selector means for identifying each of said cells arriving thereat and storing each of said cells in a corresponding one of the plurality of said cell buffers;
    a cell output portion for outputting selected ones of each of said cells stored in the plurality of cell buffers;
    an output time notice counter having a count value incremented every cell period as a minimum period required to send each of said cells from said cell output portion;

cell output enabling time registration means provided for the respective traffic signals having different shaping grades for sequentially registering output enabling times of said plurality of cell buffers corresponding to the respective traffic signals; and cell sending permit means for comparing an output time noticed by said output time notice counter with the output enabling times registered in said cell output enabling time registration means provided for every virtual channel to enable one of said plurality of cell buffers to output the cell stored therein to said cell output portion and permitting enabled ones of said cell buffers to send the cell stored therein to said cell output portion.

2. A traffic shaping device as claimed in claim 1, wherein said cell output enabling time registration means comprises cell output interval registration means for registering a cell output interval for every one of said communication traffic signals having different shaping grades and cell output enabling time registration means for forming a sum by adding the cell output interval to a time at which said enabled ones of said cell buffers permitted by said cell permit means send at least one of each of said cells stored therein and registering the sum as a next output enabling time.

3. A communication traffic shaping device comprising:

a plurality of cell buffers each provided for respective communication traffic signals having different shaping grades of cells arriving at said plurality of cell buffers according to an ATM transfer system;

a cell buffer selector means for identifying each of said cells when each cell arrives and storing each of said cells in one of said plurality of cell buffers which corresponds to each of said cells;

a cell output portion for outputting selected ones of each of said cells stored in the plurality of cell buffers;

an output time notice counter having a count value incremented every cell period as a minimum period for sending each of said cells from said cell output portion;

cell output enabling time registration means provided for the respective communication traffic signals having different shaping grades for sequentially registering output enabling times of said plurality of cell buffers corresponding to the respective traffic signals;

priority registration means provided for each of the communication traffic signals having different shaping grades for registering priorities for cell outputs of each of the cells stored in corresponding ones of said plurality of cell buffers; and cell sending permit means, said cell sending permit means, when there are a plurality of said plurality of cell buffers enabled to output their cells by comparing an output time noticed by said output time notice counter with the output enabling times registered in said cell output enabling time registration means provided for every virtual channel, permitting one of said plurality of enabled cell buffers which has a highest priority to output the cell stored therein to said cell output portion.

4. A communication traffic shaping device as claimed in claim 3, wherein said cell sending permit means comprises priority regulation means which, when there are a plurality of said plurality of cell buffers enabled, lowers the priority of said cell buffer permitted to output the cell stored therein which is registered as a registration content in said priority registration means and increases he priorities of said cell buffers not permitted to output the cells stored therein, which are registered by said priority registration means.

5. A communication traffic shaping device as claimed in claim 4, wherein said priority regulation means resets the registration content of said priority registration means when the priority is to be lowered and counts up the registration content of said priority registration means one by one when the priority is to be increased.

* * * * *